United States Patent
Khan et al.

(10) Patent No.: US 6,401,206 B1
(45) Date of Patent: Jun. 4, 2002

(54) METHOD AND APPARATUS FOR BINDING ELECTRONIC IMPRESSIONS MADE BY DIGITAL IDENTITIES TO DOCUMENTS

(75) Inventors: Shabbir A. Khan, Cupertino, CA (US); Saeed A. Rajput, Coral Springs; Basit Hussain, Palm Harbor, both of FL (US)

(73) Assignee: Skylight Software, Inc., San Jose, CA (US)

(*) Notice: Subject to any disclaimer, the term of this patent is extended or adjusted under 35 U.S.C. 154(b) by 0 days.

(21) Appl. No.: 09/035,670

(22) Filed: Mar. 5, 1998

Related U.S. Application Data

(60) Provisional application No. 60/038,082, filed on Mar. 6, 1997.

(51) Int. Cl.$^7$ .............................. H04L 9/00; H04K 1/00
(52) U.S. Cl. ...................................... 713/176; 713/183
(58) Field of Search .................................. 713/176, 183

(56) References Cited

U.S. PATENT DOCUMENTS

| | | | | |
|---|---|---|---|---|
| 4,339,807 A | | 7/1982 | Uchimura et al. | 364/900 |
| 4,405,829 A | | 9/1983 | Rivest et al. | 178/22.1 |
| 4,462,473 A | | 7/1984 | Valestin | 177/25 |
| 4,748,668 A | * | 5/1988 | Shamir et al. | 380/30 |
| 4,885,777 A | | 12/1989 | Takaragi et al. | 380/30 |
| 4,993,068 A | * | 2/1991 | Piosenka et al. | 380/23 |

(List continued on next page.)

FOREIGN PATENT DOCUMENTS

WO  pct/us98/4741  3/1998

OTHER PUBLICATIONS

S.A. Rajput et al., "Method and Apparatus of Binding a New Electronic Identity With Documents", Skylight Software, Inc., pp. 1–22, 1997.

*Primary Examiner*—Gilberto Barron, Jr.
*Assistant Examiner*—Douglas Meislahn
(74) *Attorney, Agent, or Firm*—Flehr Hohbach Test Albritton & Herbert LLP

(57) ABSTRACT

This invention creates a portable digital identity of the individual that includes personal information, and may also include data representing the person's handwritten signature and one or more passwords. The digital identity optionally includes data representing seals, fingerprints and biometric information. The digital identity can be used to bind a verifiable electronic impression with an electronic document using electronic watermarks so that any modification in the document or the electronic impression bound to the document can be detected. The personal information included in the digital identifiers can include, in addition to a password, answers to questions that are composed by the user. The digital identity of a user can be created once and stored after encryption for protection. This digital identity can then be used by the signer to bind a unique instance of an impression of the digital identity to any document. Document and digital identity verification including verifying a cryptographic digital signature that establishes the integrity of the document, and ensures non-repudiation of origin to the extent that it was signed by the user's private key.

67 Claims, 10 Drawing Sheets

U.S. PATENT DOCUMENTS

| | | | |
|---|---|---|---|
| 4,995,081 A | 2/1991 | Leighton et al. | 380/23 |
| 4,995,082 A | 2/1991 | Schnorr | 380/23 |
| 5,101,437 A | 3/1992 | Plamondon | 382/3 |
| 5,111,512 A | 5/1992 | Fan et al. | 382/3 |
| 5,163,097 A * | 11/1992 | Pegg | 380/21 |
| 5,193,114 A * | 3/1993 | Moseley | 380/23 |
| 5,195,133 A | 3/1993 | Kapp et al. | 380/9 |
| 5,202,930 A | 4/1993 | Livshitz et al. | 382/3 |
| 5,203,263 A | 4/1993 | Berger et al. | 101/76 |
| 5,222,138 A | 6/1993 | Balabon et al. | 380/23 |
| 5,229,764 A * | 7/1993 | Matchett et al. | 340/825.34 |
| 5,280,527 A | 1/1994 | Gullman et al. | 380/23 |
| 5,337,358 A | 8/1994 | Axelrod et al. | 380/23 |
| 5,369,702 A | 11/1994 | Shanton | 380/4 |
| 5,386,369 A | 1/1995 | Christiano | 364/464.01 |
| 5,434,917 A * | 7/1995 | Naccache et al. | 380/23 |
| 5,434,928 A | 7/1995 | Wagner et al. | 382/187 |
| 5,465,299 A | 11/1995 | Matsumoto et al. | 380/23 |
| 5,490,217 A | 2/1996 | Wang et al. | 380/51 |
| 5,508,817 A | 4/1996 | Kunigami | 358/402 |
| 5,510,992 A | 4/1996 | Kara | 364/464.02 |
| 5,541,994 A | 7/1996 | Tomko | 380/30 |
| 5,544,255 A | 8/1996 | Smithies et al. | 382/119 |
| 5,586,037 A | 12/1996 | Gil et al. | 364/464.03 |
| 5,606,609 A | 2/1997 | Houser | 380/4 |
| 5,613,004 A | 3/1997 | Cooperman | 380/28 |
| 5,721,788 A * | 2/1998 | Powell et al. | 382/100 |
| 5,748,737 A * | 5/1998 | Daggar | 380/24 |
| 5,818,936 A * | 10/1998 | Mashayekhi | 380/25 |
| 5,943,423 A * | 8/1999 | Muftic | 380/25 |

* cited by examiner

METHOD AND APPARATUS FOR BINDING ELECTRONIC IMPRESSIONS MADE BY DIGITAL IDENTITIES TO DOCUMENTS

This application claims benefit to Provisional Application No. 60/038,082 filed Mar. 6, 1997.

The present invention relates generally to methods for creating the digital identity of an individual, binding an impression of it to electronic documents, and more particularly to producing reliable and consistently verifiable electronic impressions for automatic identity verification.

BACKGROUND OF THE INVENTION

This present invention is designed to enhance the exchange of personal, confidential, legal and proprietary information reliably through electronic means. An embodiment of this invention provides an electronic equivalent of the conventional "paper" paradigm, in which documents are authenticated and validated by signatures and seals. In the paper paradigm, signatures and seals, as imprinted on a document, represent the identity of the signer. That is, handwritten signatures, seals (and sometimes fingerprints) are the true representative of the signer.

The desired requirements of an electronic equivalent of the "paper" paradigm, are listed below. The requirements are:

1. The document and the signatures imprinted on the document can not be forged or broken easily (not usually satisfied by passwords).
2. The receiver or anybody else cannot alter the signed document—the document with which the identity's impression is bound—or the identity's impression itself as it is bound to the document, without being detected.
3. The signer cannot deny the act of signing the document (non-repudiation of the origination source of the document).
4. The document can not be duplicated and still be claimed original for re-submission.
5. Full reconstruction of identity, in case of loss of identity.
6. Consistency of comparison results.
7. The verifier should not be assumed trusted. In other words, the verifier should not be able to use information he has about the signer to forge the signer's identity.
8. The process of signing the document and its verification should be simple and user friendly.
9. The process of signing the document should not rely on sophisticated technology that is not readily available to ordinary computer users other than software implementing the present invention.
10. The signatures, seals and the thumb prints are imprinted on the document and can be inspected by the experts using visual and other verification methods.

We will see that the conventional electronic systems address only a subset of these requirements. A typical electronic replacement of "paper" paradigm uses only cryptographic digital signatures, in which encryption keys generated by the system are used. These keys are provided by the system to the user to be used as their electronic identities. Like seals, these keys have no real binding to the signer because they are not derived from aspects of physical behavior or what the signer knows.

Other typical electronic replacements of the "paper" paradigm use only electronic representations of handwritten signatures. Simpler versions simply use digitized version of handwritten signatures and bind it to the electronic document using cryptography. More sophisticated versions derive probabilistic parameters of the signature and use these parameters as the basis of the identity of the user. Some implementations do bind digitized handwritten signatures cryptographically with the document but provide little protection of the signer's identity from forgeries created by the verifier. Furthermore, the identity of the individual is solely dependent on digitized handwritten signatures.

Simpler versions mentioned above rely completely on encryption and cryptographic checksums (also called hash values) for the sake of binding the digitized handwritten signature with the electronic document. The checksum is digitally signed using cryptography.

One disadvantage of using a digitized handwritten signature is that the digitized version of a handwritten signature can easily be copied once it is decrypted. Another disadvantage is that the digital checksum of two digitized-handwritten-signature samples is almost never the same, even if they belong to the same person. Therefore effectively the identity of the user is derived from the cryptographic key used for digitally signing the checksum rather than the handwritten signature. Hence from a security point of view, systems using digitized handwritten signatures are only as effective as systems that use only cryptographic digital signatures.

More sophisticated versions of the digitized handwritten signature based security systems derive the identity of the user from probabilistic parameters derived from the signature while it is being executed. The input devices used for capturing the signature in such systems are relatively expensive and not widely available. Since no two signatures of the same person are alike, the parameters derived from them are never exactly the same. Therefore, such systems rely on probabilistic comparisons of the stored reference parameters at the location of verification with those provided with the document. The verification process utilizing probabilistic parameters can never be fully trusted as it depends upon several factors not within the control of the system, such as the quality of parameter extraction at the time of reference parameter extraction, the quality of signature capture at the time of authentication of the document, the mood and physical state of the signer and the age of the reference parameters (signatures characteristics for a person change with time). Since, verification can never be fully trusted, it becomes a poor choice for automatic verification systems. Furthermore, the need for availability of these parameters at the destination is a security risk, since anybody in possession of these parameters can create a forgery with some programming effort.

Electronic document signing systems using biometric information are high cost systems. They use biometric information such as voice, fingerprint, and retina scans. These systems authenticate documents based oh probabilistic comparison of one or more stored samples with the freshly retrieved sample. The problems associated with these forms of identity representations are the same as those associated with handwritten signatures. Often, the system operation is based on extraction of statistical and mathematical parameters. Based on these parameters, and the knowledge of algorithms used for calculating the correlation, some identities can be reverse engineered for beating the automatic verification systems.

Yet another conventional replacement of "paper" paradigm is based on the use of passwords for identifying the signer. This is a paradigm based on what the person knows, and relies on the signer to choose a "good" security password. The level of protection against attacks is only as good as the passwords picked. Unfortunately, the best passwords are most unfriendly and difficult to remember. It is well known that users often pick poor passwords that can easily be guessed, or reuse passwords excessively.

The document authentication schemes discussed above only partially satisfy the conventional requirements of binding a document sender's identity to the document.

In systems using public key cryptography, for example U.S. Pat. No. 5,369,702 to Shanton, the signer can deny the act of signing (non-repudiation of the origination source of the document) by claiming that the private key was compromised. Similarly, the verifier can create a forgery of the private key or the cipher text without being detected if the security assumption of the public key cryptography is broken.

There is a need for the following additional requirements for digital identities as well as the impressions made by these identities on electronic documents:

1. Full reconstruction of identity, in case of loss of identity.
2. Consistency of comparison results.
3. The verifier should not be assumed to be trusted. In other words, the verifier should not be able to use the information he has about the signer to forge the signer's identity.
4. The process of signing the document should not rely on sophisticated technology that is not readily available to an ordinary computer user.
5. Forgeries and repudiation of origin can be proven even if the public key cryptography's security assumption is broken.
6. The process of signing the document and the verification process should be simple and user friendly.
7. The signature should be verifiable throughout and after the lifetime of the signer.
8. The digital identity of the signer should maintain history of all the changes that are made to the identity itself during its life.
9. The signatures, seals and the thumb prints imprinted on the document should offer both visual and digital means for verifying the signature.

We can broadly classify various electronic document authentication methods into two categories: deterministic or probabilistic.

The digital identities used in deterministic authentication methods can be fully recovered in original form. Examples are methods based on passwords, cryptographic keys, or ones that simply bind digitized signatures with documents cryptographically.

The digital identities used in probabilistic authentication methods cannot be fully recovered in original form and comparisons have to rely on one or more probabilistic correlation functions. To use probabilistic authentication methods in real life, comparison results have to be interpreted within some tolerance ranges.

Examples of these methods include handwritten signatures, voice, fingerprints and other biometric representations. Typically a finite number of parameters are derived from these representations and these parameters are used for authentication.

SUMMARY OF INVENTION

The present invention creates a digital identity of an individual that can be used in electronic authentication systems for signing the electronic documents. This identity typically includes personal information, images, handwritten signature and passwords. It optionally includes seals, fingerprints and other biometric information. This digital identity can be used to authenticate the integrity and identity of an electronic document, as well as for non-repudiation of the electronic document's origination source. The digital identity also has other properties associated with conventional electronic authentication systems.

Forgeries of the digital identity, attacks against it, and repudiation of use of the digital identity can be detected by use of an identifier computed from personal information provided by the user. Passwords can be used as one component of this personal information. Using the digital identifier enables forgeries to be detected and repudiation of origin to rebuffed, even if the public key cryptographic assumption is broken. Some versions of the digital identifier can also be reconstructed in case the original digital identity is lost.

This digital identity can be used in automatic verification systems because it provides consistent results, unlike handwritten signature systems in which the comparison results for two signatures may vary significantly, leading to unreliable results.

Although the digital identity may contain handwritten signatures, images, seals, fingerprints and other biometric information in digitized or parameterized form, the authentication and verification process associated with the digital identity does not solely depend on these components. Neither does the security depend only on cryptographic keys or difficult-to-remember passwords.

Since the use of parameterized signature, fingerprints, photographic images and biometric information is optional, the present invention does not depend on sophisticated technology that is not readily available to an ordinary computer user.

The digital identity generated in accordance with the present invention is portable, such as in a floppy disk, smart card, memory card, or other storage device. A compromised storage device is useless, because the digital identity information on it is encrypted. Furthermore, the verifier does not need to know or maintain a document signer's sensitive information to perform verification. As a result, the verifier can be a non-trusted party who does not have to know the private information or parameters associated with the identity of the signer.

Electronically signing a document is a cumbersome process, especially when it contains a variety of representations of the signer such as handwritten signatures, photographic images and biometric information. Hence in one embodiment of the invention, the digital identity of the signer is created once and stored after encryption for protection. This identity can be used with little effort to bind a verifiable impression made by the signer's identity to any document. A series of techniques can be used for the person's identity verification. First the cryptographic digital signature is verified which establishes the integrity of the document, and ensures non-repudiation of origin to the extent that it was signed by the holder of the private key. A time stamp or random number is used to establish that the document is not a duplicate presented as an original. In case of a dispute, digital identity marks, which are functions of the document and the personal identifiers, are used to verify that the digital signature indeed made the signature impression on the accompanying document.

BRIEF DESCRIPTION OF THE DRAWINGS

FIG. 9 depicts a document verification process for such documents.

DETAILED DESCRIPTION OF THE PREFERRED EMBODIMENTS

Figure 2:
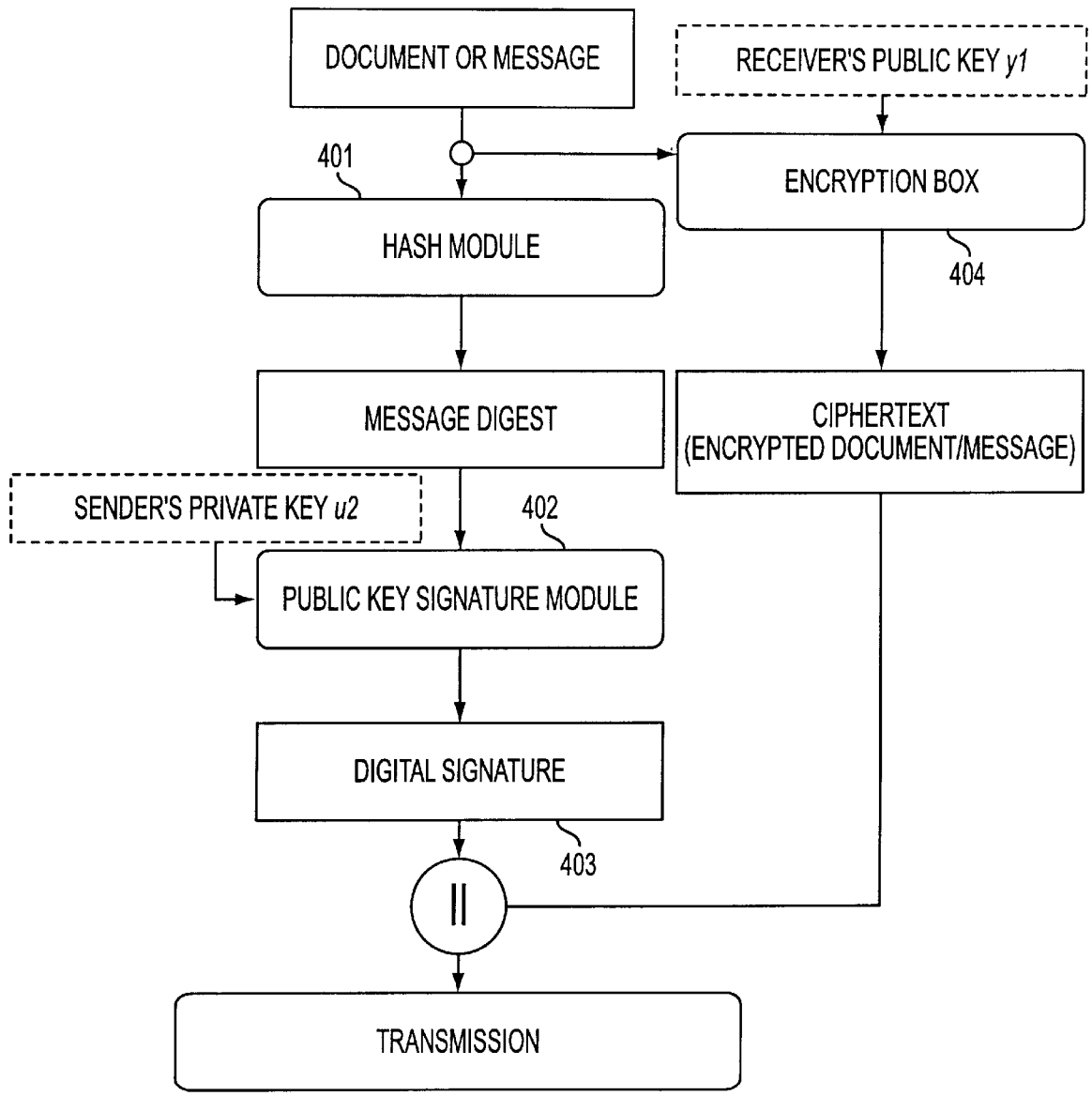
FIG. 2 schematically depicts a prior art method of using a public key signature to digitally sign messages.
Figure 3:
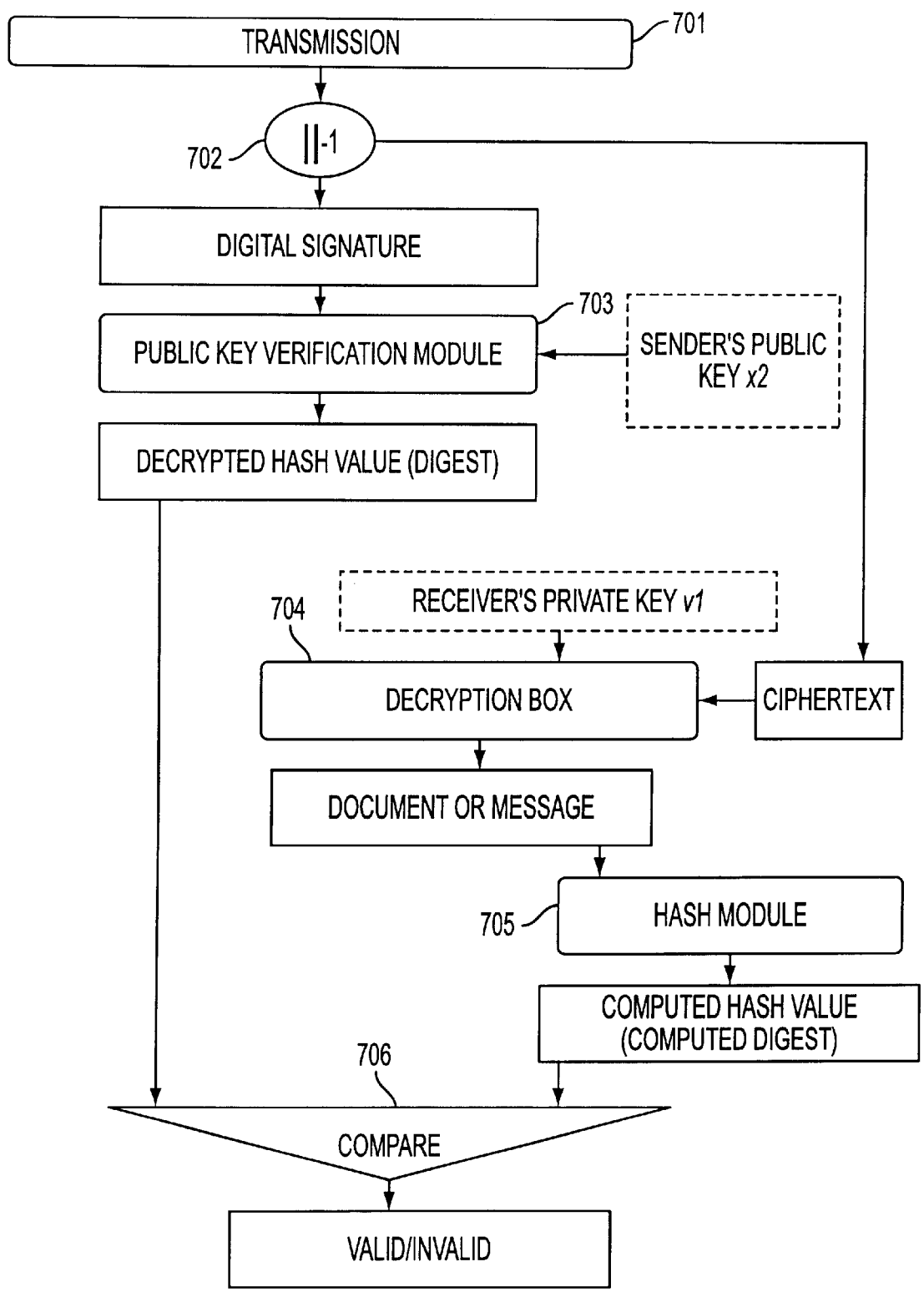
FIG. 3 schematically depicts a prior art method of verifying a digital signature and retrieving an original document from encrypted information.

We will describe one embodiment of our invention in detail. Before description of the embodiment, however, we would briefly describe the prior art related to use of conventional public key and symmetric cryptographic schemes in digital encryption and digital signatures schemes. This prior art is depicted in FIGS. 1, 2, and 3.

Figure 1:
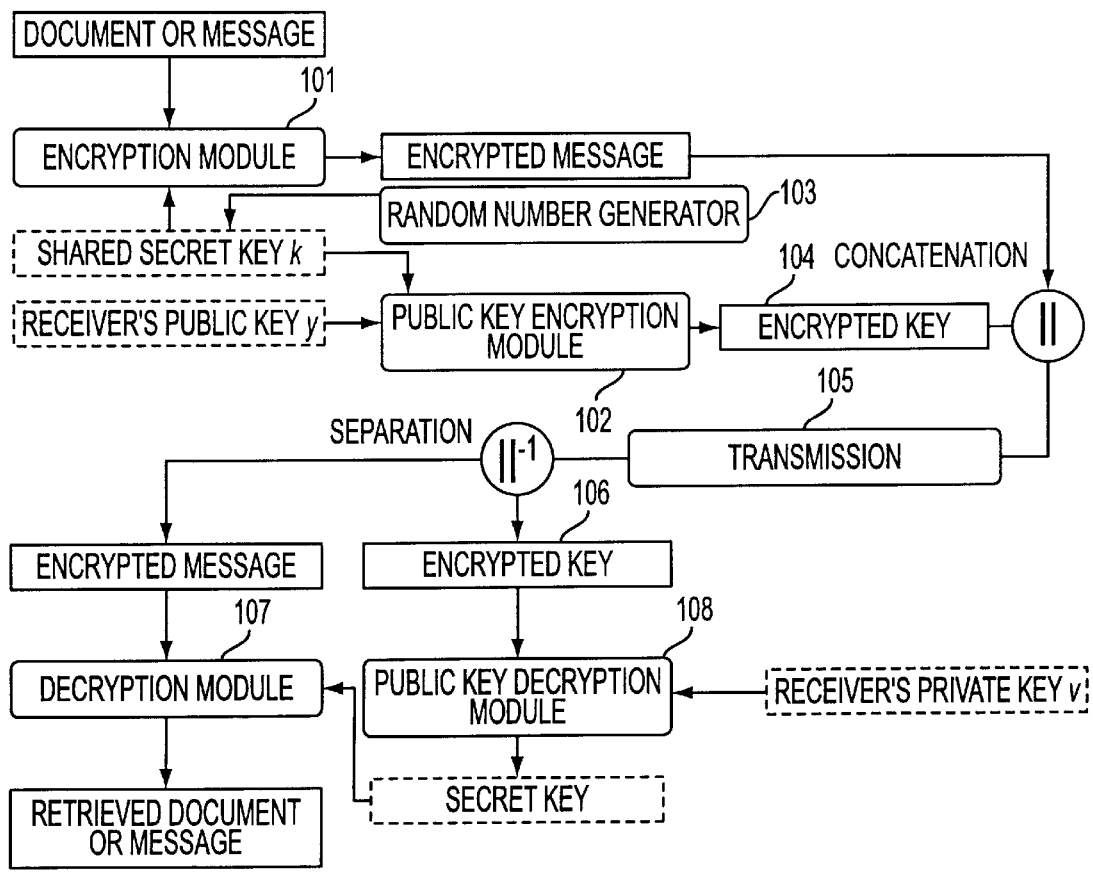
FIG. 1 schematically depicts a prior art method of using a combination of symmetric and public key schemes to efficiently encrypt long messages.

FIG. 1 depicts the use of a combination of symmetric and public key schemes to efficiently encrypt long messages. Encryption Module 101 represents any symmetric key encryption procedure, including DES and IDEA. This module needs a key whose size depends on the encryption method used. This key is generated by a random number generator 103. Instead of providing this key directly to the verifier, it is encrypted by public key encryption module 102 that utilizes any public key cryptography method, including RSA, DSA and Elliptical Curves Algorithms. The receivers public key is used to perform this encryption. The encrypted key is concatenated with the encrypted message (104) for transmission 105.

The transmission module 105 may include any communication media, such as real time communication systems, storage media and store and forward systems.

On the receiver end, the encrypted key is first separated from the message (106), the key is decrypted by the public key decryption module 108 using the receiver's private key. The decrypted key is used to decrypt the message by symmetric key decryption module 107.

FIG. 2 and FIG. 3 show a prior art method of using public key signatures to authenticate messages. In the system depicted, hash module 401 first computes a summary or a digest of the document or message. This digest is then signed by the public key signature module 402 using the signer's private key to produce digital signature. This process enables authentication and non-repudiation of origin, because nobody but the holder of the private key is able to produce exactly the same signature. If secrecy is also needed, the message can be encrypted by encryption box 404 using the scheme shown in FIG. 1. In the shown embodiment, the digital signature is shown to be concatenated (403) with the encrypted message after encryption. In alternative embodiments, the concatenation can be done before encryption so that the digital signature is further encrypted along with the message.

FIG. 3 depicts the process of verifying the digital signature and retrieving the original document from the encrypted information. In the shown embodiment, the digital signature is first separated (702) from the encrypted message before decryption of the message by the decryption box 704. In alternative embodiments, decryption is performed before the separation.

To verify, the decrypted message is hashed again, using the same algorithm used in 401, to generate the message digest. The original version of message digest is also derived from the received digital signature by public key verification module 703 using the senders public key. The two values of the message digest are compared (706). If the two are exactly the same, the digital signature on the document is verified.

Creating a Digital Identity

Figure 4:
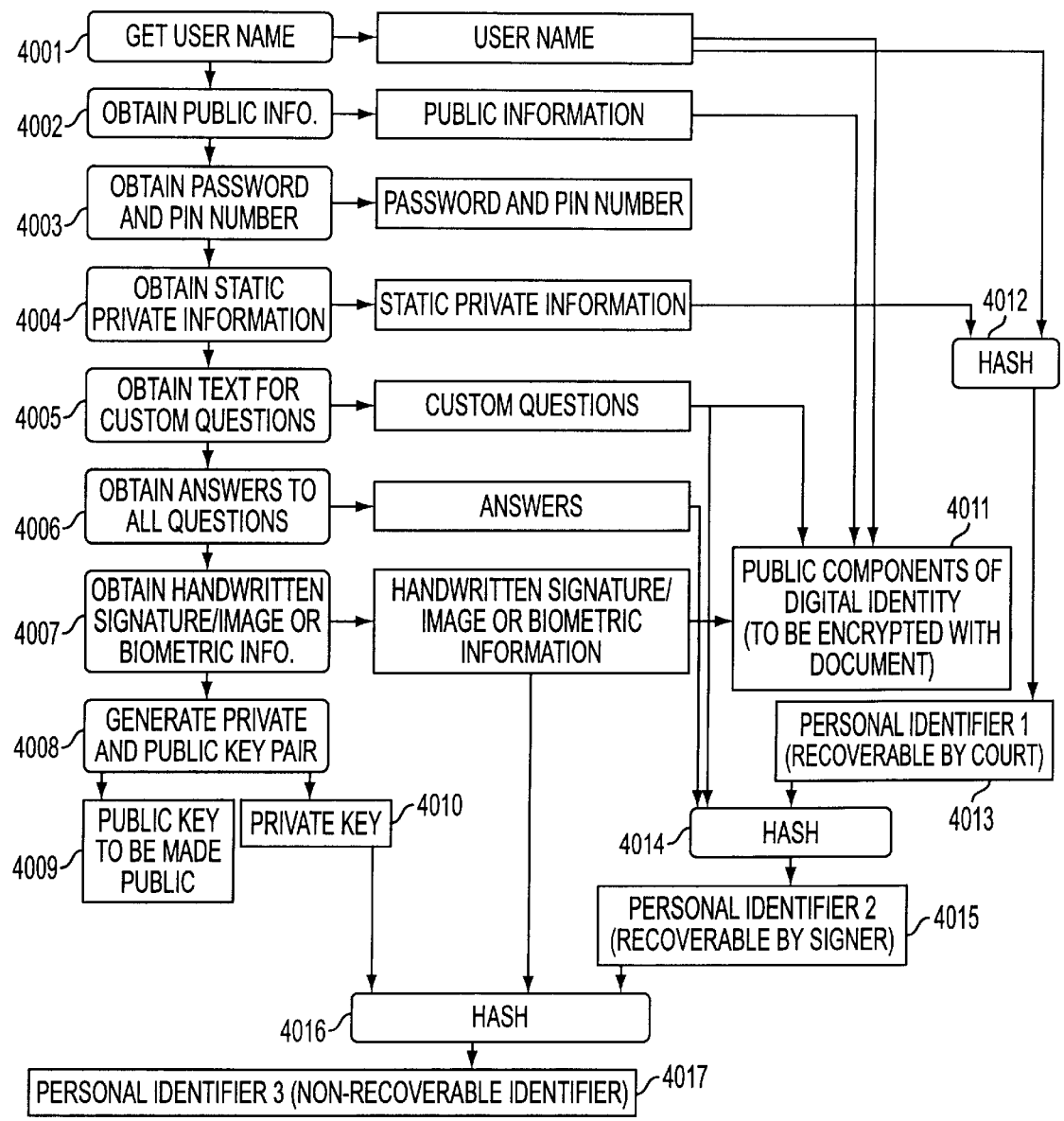
FIG. 4 is a flow chart depicting how three personal identifiers are created during the process of creating a digital identity.

FIG. 4 depicts one embodiment of the digital identity creation process of the present invention. This process is used once in the life time of a digital identity. First a complete user name is obtained (4001).

Through a series of questions in the user interface, the signer is prompted to enter his public information (4002). Public information includes any information that is sufficient to identify and locate the signer and any other information that he is willing to share with the verifier or the recipient. This public information (including the residential office addresses, phone numbers and e-mail addresses) is expected to change during the life time of the digital identity and its owner.

The user is then prompted to provide a password and/or pin number (4003). The user is then prompted (4004) to provide some personal information, including his password. The questions to elicit personal information are similar to those generally asked by financial institutions (e.g. date of birth, mother's maiden name, social security number or a unique identity number) at the time of opening an account and also used at later dates by the financial institutions to authenticate their customers over the phone. These parameters, obtained at steps 4003 and 4004, are used to protect the digital identity.

In the next phase (4005) the user is requested to enter text representing a few optional questions that only he can answer. He is also prompted (4006) to give brief answers to each question he entered. These answers to customized questions will be typically picked from the signer's own life experience and thus they will vary from individual to individual. This further ensures the integrity of signer's digital identity beyond what is currently used by financial institutions. It would be virtually impossible to answer all custom designed questions by an otherwise informed attacker.

The electronic representation of a handwritten signature, or a seal, or a stamp; and optionally fingerprints, photographic images, and other biometric information is then acquired through electronic files or directly from an information capturing device (4007). The electronic form of this information can be directly used or parameters extracted from this information can be used instead. These parameters can be optionally used for further probabilistic and/or statistical comparison.

The system then generates a public/private key pair (4008). The private key 4010 will be maintained with the digital identity, whereas the public key 4009 will be presented to a certification authority for publishing.

A user's "digital identity" in a preferred embodiment includes the user name obtained at step 4001; the public information obtained at step 4002; and private information obtained in steps 4003 and 4004; the personal questions and answers obtained in steps 4005 and 4006; the public/private key pair generated at step 4008; the handwritten signature and/or other biometric parameters obtained at step 4007; and personal identifiers 1, 2 and 3.

The digital identity may further include an indication of a desired security level, which may be changed from time to time either by the user, or automatically by an authentication device when the user or an authorized person is unable to prove they are the owner of the digital identity (as described below with reference to FIG. 5). The digital identity may further include history data indicating changes made to the digital identity over time.

The digital identity may further include owner profile information for use with electronic systems including but not limited to registration, activity tracking, information retrieval, accessing services over the Internet and merchandise and services purchasing systems.

Figure 10:
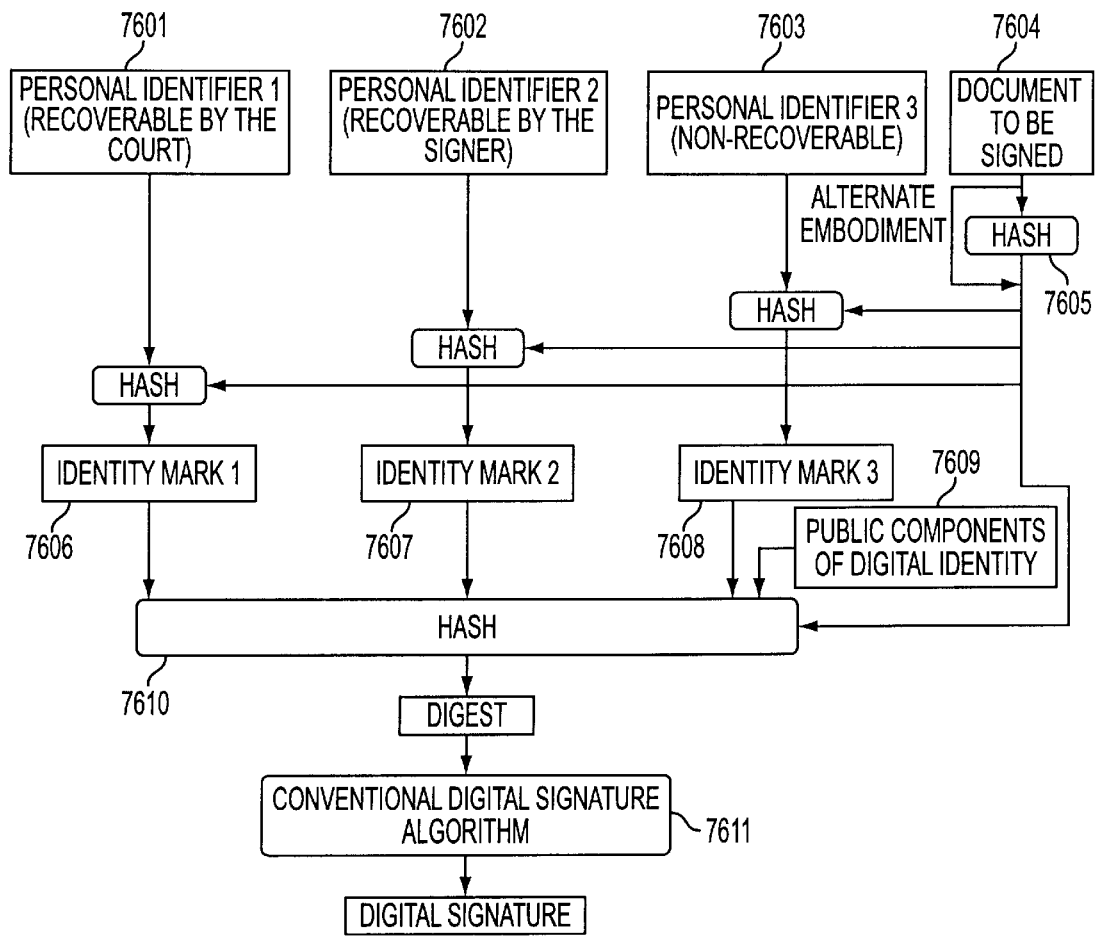
FIG. 10 depicts the relationships between the three personal identifiers, the document being signed, three identity marks, the public information belonging to the digital identity and the resulting unique signature impression.

FIG. 10 shows the relationships between the document being signed, three personal identifiers, three identity marks, the public information belonging to the digital identity and the resulting unique signature impression.

Three types of personal identifiers can be generated from the information entered thus far into the system. A recoverable personal identifier (also called personal identifier 1) 4013 of the user is created by applying a hash function 4012 to the concatenated information including the signer's public name and static private information. This hash is fully recoverable by any authority which has access to the static private information of the user. Another recoverable personal identifier (also called personal identifier 2) 4015 is created by applying a hash function (4014) on concatenated information including 4013 (personal identifier 1), custom questions 4005 and answers in module 4006. The resulting personal identifier 4015 is fully recoverable as long as the signer maintains his long term memory (i.e., by re-entering the public and private information and then reapplying the hash functions).

Another non-recoverable personal identifier (also called personal identifier 3) 4017 can be created by hashing (4016) the recoverable personal identifier 2 (or in an alternative embodiment, directly using the information from which the recoverable personal identifier is computed), Private Key 4010, signatures and/or images and other biometric information. This personal identifier is non-recoverable because every sample of the biometric information is unique which would lead to a different hash. This hash can be useful for verification if it is maintained by a trusted third party. The third party can notarize the non-recoverable identifier to be original and maintain a copy in a safe place for recovery in case of a dispute.

An alternate embodiment (not shown here) uses probabilistic parameters computed from any or some of the biometric information for the individual (typically including the person's signature). These parameters can be notarized and stored by the notary as another means of verification. These parameters can be used to authenticate any future samples of digital identity of the same user even if they were recreated (and therefore will have a different non-recoverable identifier) using probabilistic comparisons. The trust in these comparisons will never be 100% though and results of the comparison will have to be accepted with a certain level of tolerance.

Shortly we will discuss techniques that can utilize the personal identifier 4013 or 4015 or 4017 to protect the user against forgery attacks at various levels. These personal identifiers can also be used to further protect the receiver/verifier of the message against denial of origin (repudiation of origin) by the originator, especially in the case where user claims that his private key was compromised.

The user name obtained in step 4001, public information obtained in step 4002, static private information in step 4004; personal questions in 4005, answers to personal questions in 4006, public/private key pair in 4008, handwritten and/or biometric information in 4007, and the three personal identifiers (1, 2 and 3) constitute the Portable Personality Identity of the signer.

The creation of such a sophisticated identity is a time consuming process. However, this digital identity has to be generated only once in its life cycle and it can be easily maintained by the owner. Once a digital identity has been created, it can be easily used to authenticate the owner and sign as many documents as desired by the owner of the identity. The public portions of this identity and all the measures to prove that the original document was signed by the owner of the identity are bound to the document at the time of signing.

The information provided and generated during this process of creation of a digital identity is saved by encrypting it with a symmetric key generated from the user name, pin number and password in this embodiment. In possible alternative embodiments, more sophisticated encryption keys can be created by hashing some of the personal answers.

In this embodiment, the personal portable digital identity can be edited by the owner without affecting the verifications of signed documents based on personal identifiers 1 and 2. All modifications to the identity will be saved, and recorded in a history record, as part of the digital identity of the owner. Although the owner may decide to put a filter on the number of changes to be reflected and stored as part of the digital identity to keep its footprint size small, there is no limit on the number of changes the owner can make to the digital identity.

Using the Digital Identity

The Digital Identity can be used to authenticate the user first and then make a signature impression on the document that is being signed by the user and bind the impression made by the digital identity with the document itself. The impression made by the Digital Identity includes owners public information, public keys, identity marks, time stamp and the positional information of the signature impression within the document.

Figure 5:
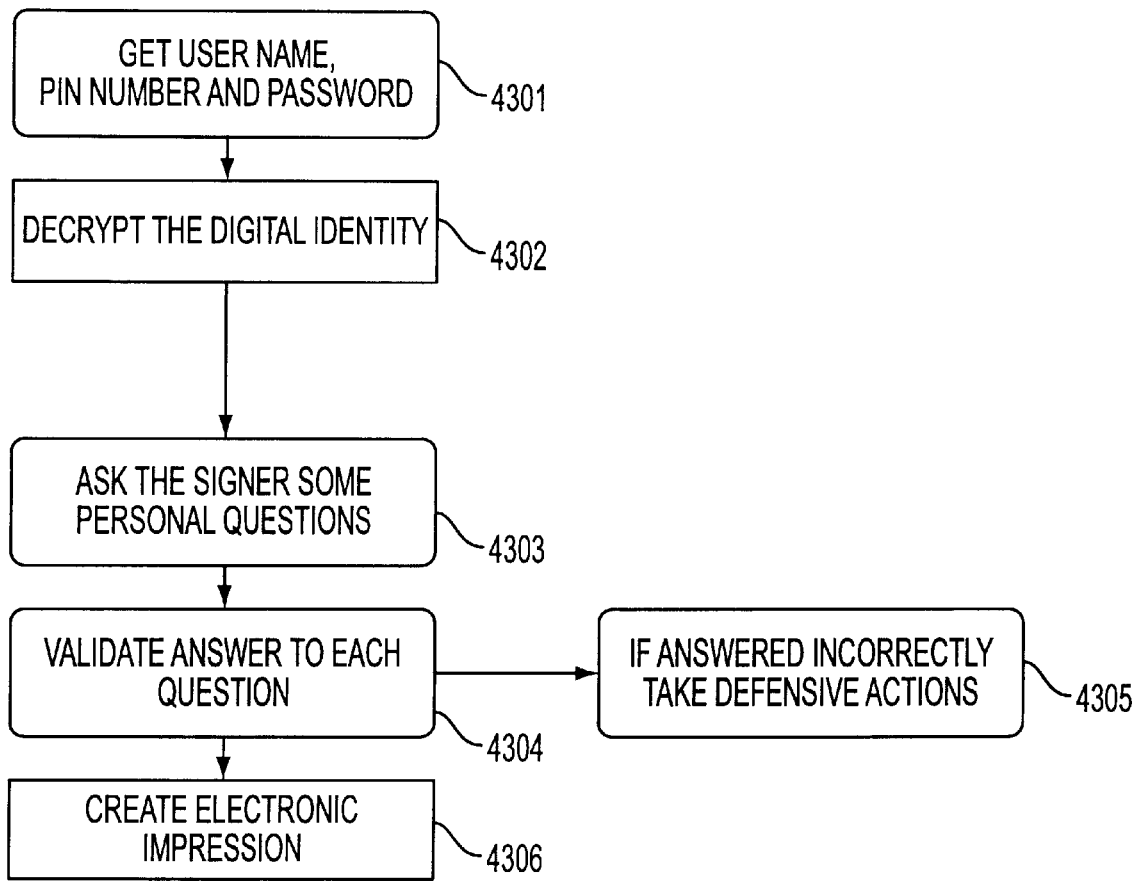
FIG. 5 is a flow chart depicting the process of binding an electronic impression to a document.

FIG. 5 indicates how the process of signing a document and binding an electronic impression made by the identity with the document can be simplified, by requiring the user to answer just a few questions.

In this embodiment of the invention, the user name and password is obtained in module 4301. Actually, prior to this first step, the user (i.e., owner of the digital identity) may be required to submit "physical evidence" that he/she is the owner of the digital identity. In particular, the digital identity is preferably stored in computer readable media such as smart cards, and the authorities who create digital identities may display (i.e., affix) a photograph of the owner of the digital identity on the exterior surface of the storage device (e.g., a smart card) to serve as a Picture ID of the owner of the digital identity. In such embodiments, the owner may be required to submit to a casual visual comparison of the owner with the photograph on the storage device before being allowed to begin the electronic ownership validation process represented by steps 4301 to 4305.

The decryption key is created from the password, pin number and user name using the same hash function that was used to create the encryption key. In alternative embodiments the key can be created from the same personal answers that were used during encryption of the digital identity. The key is used to decrypt (4302) the digital identity only to place it in the volatile memory. The signer is then challenged with a few questions (4303) that are randomly selected from his private information or the custom questions he provided.

The number of questions asked can be made to depend on the level of security required based on the importance of the contents of the document being signed. During this question-answer (4303–4304) session, if the signer answers any of the questions incorrectly, he is given a limited number of chances to try again which may range from one to "n". We recommend using n<4. If the signer is unable to answer a particular question in given number of trials (4305), the system locks for a wait period, range by a random number generator, the digital identity information is erased from the volatile memory to avoid misappropriation of the digital identity, and then the process is restarted from the beginning with a new set of questions. Detecting an attack on the digital identity during the authentication process, it can set itself to a higher level of security making it even more difficult for the attacker to break it. The fact that signer is not forced to answer all the questions provides user-friendliness, and the fact that the asked questions are picked at random unpredictably provides almost the same level of security that would be provided when all questions are asked. Locking of the system for a wait period virtually eliminates the risks of dictionary attacks. When all the questions being asked are successfully answered, the public identity of the signer is extracted from the digital identity (4306) and includes all the information that is to be included in the document, typically including handwritten signature bitmaps and all the necessary measures to protect, verify and compare the electronic signature impressions made on a given document.

Figure 6:
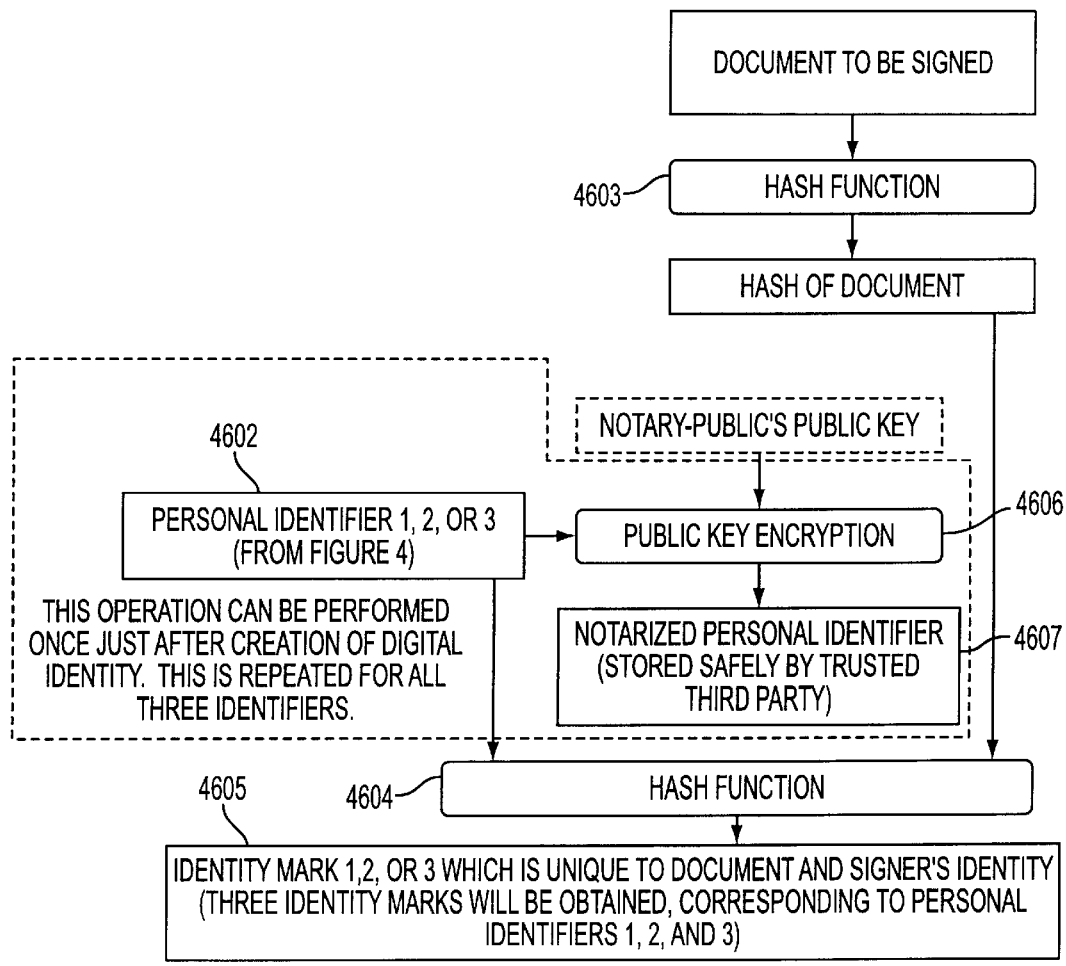
FIG. 6 is a flow chart showing how an impression (using three identity marks) is made by the digital identity of a signer and is bound to a document or a message.

FIG. 6 shows how the digital identity of the signer is bound to a document or message. Module 4602 in FIG. 6 represents either module 4013 or module 4015 or module 4017 of FIG. 4, which have been discussed above. In the shown embodiment, the document is independently hashed (4603) and document hash and personal identifier hash are further hashed (4604) to form an irreversible identity mark that is unique to the digital identity of the signer and to the document. In an alternative embodiment, the personal identifier is concatenated with the document and a hash function is applied to both to obtain the identity mark.

The three identity marks 4605 are carried with the document as part of the electronic impression. The electronic impression made by the digital identity includes, in addition to the identity marks, signatures and/or biometric information and/or images, public information, and text of custom questions provided by the signer.

Verification Methods

The identity marks can be used to detect forgeries as discussed below. In order to protect the receiver/verifier against false claims of the signer, a protocol can be adopted in which the signer has to submit his personal identifiers to a third party for notarization and safe keeping as depicted by 4606 and 4607. In order to protect the signer from a potential impersonation attack by the trusted third party, the signer should withhold at least one of the identifiers from the trusted third party. The signer can disclose the identifier, that was withheld from the trusted third party, to the courts in case of a legal dispute. The signer can also, by making changes to the digital identity, create a new identifier for future withholding, in case the identifier being withheld was compromised or an undesired disclosure was made by any party. These changes will be recorded as part of the history records being securely maintained by the signer.

In an alternate embodiment (not shown here), the signer can generate a separate public/private key pair, and use the public key of the new key pair to encrypt all three identifiers prior to submitting to the trusted third party. This would necessitate the signers cooperation at the verification time to disclose the corresponding private key to decrypt the identifiers for verification purposes for resolving a legal dispute.

An alternate embodiment (not shown here) involves the signer placing a copy of the identifier, that is being withheld from the trusted third party, in escrow (e.g., in a safe deposit box or a repository for digital information) or with a different trusted third party for safe keeping and recovery, to assist in verifying the signature impressions in dispute after the signer is no longer alive or is unable to participate in the verification process.

In an alternative embodiment of this invention, the entire identity marks can be submitted to the trusted third party for notarization and safe storage. Typically, this would be desirable for documents that are exceptionally important.

Figure 7:
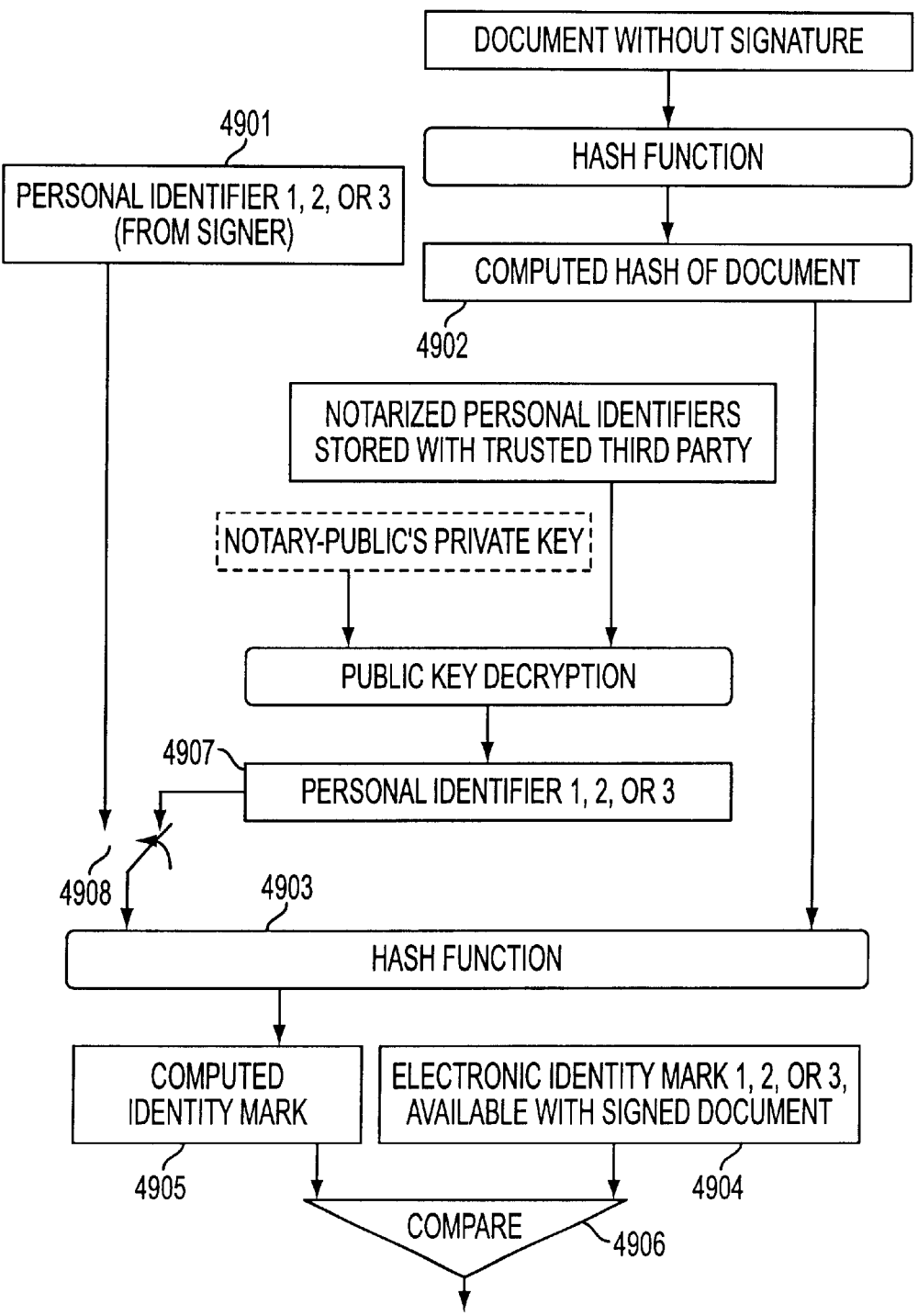
FIG. 7 is a flow chart showing how identity marks are used for detection of forgeries or modifications.

FIG. 7 shows how the identity marks will be used for detection of forgeries that might happen due to some kind of compromise in the public key cryptographic scheme. This presentation however assumes integrity of the one-way and collision-free properties of the hash functions used for generating hash values.

To prove or detect a forgery, the signer or the notary public that maintains the notarized (encrypted) personal identifiers will re-compute the identity marks from the document and the personal identifiers (4902 and 4903) and compare (4906) them with the ones attached with the document 4904 as part of the electronic impression.

If the signer performs this check himself (for detection of forgery), the switch 4908 accepts a personal identifier provided/recreated by the signer (4901). If the notary public performs the check, switch 4908 accepts as its input a decrypted personal identifier 4907. In this case the personal identifier 4907 is obtained by first retrieving the notarized (encrypted) personal identifier 4606 from the trusted third party. The notary can then decrypt (4907) the personal identifier using her private key. In either case, the document verification is performed by applying a predefined hashing function to the concatenation of the personal identifier and the hash of the document to produce a computed identity mark (4903). If the computed identity mark and the identity mark in the signed document are the same, then it is known that the document has not been modified since it was signed, and that identity mark in the document was created using the same personal identifier available from the notary or the signer. If the notary and the third party are the same, the third party will possess the private key and the document verification process is simpler.

When the verifier/receiver needs to prove the origination source of the binding of digital identity with the document, he sends the hash of the document to the notary. In the alternative embodiment, where the entire document was actually used to create the identity mark, the entire document will have to be sent to the trusted third party.

The safe storage of the notarized digital identity with the trusted third party has an additional benefit. It can be used for certification purposes in case the signer loses his own memory such that he cannot recreate the identifier, because he will not be able to answer the questions posed during recreation. It can also be used for certification based on personal identifier 3 (which can never be recreated). In such cases, the verification of the identity mark described above can be used. The verifier can take his document to the notary for verification of the identity mark.

As opposed to the case where complete signer's information is trusted to the third party, this approach has an additional benefit that the third party will not be able to extract personal information from the identifier, nor will it be able to create the signature because it does not have the private key. This approach can also be used for verification of a signature in case the signer dies.

Figure 8:
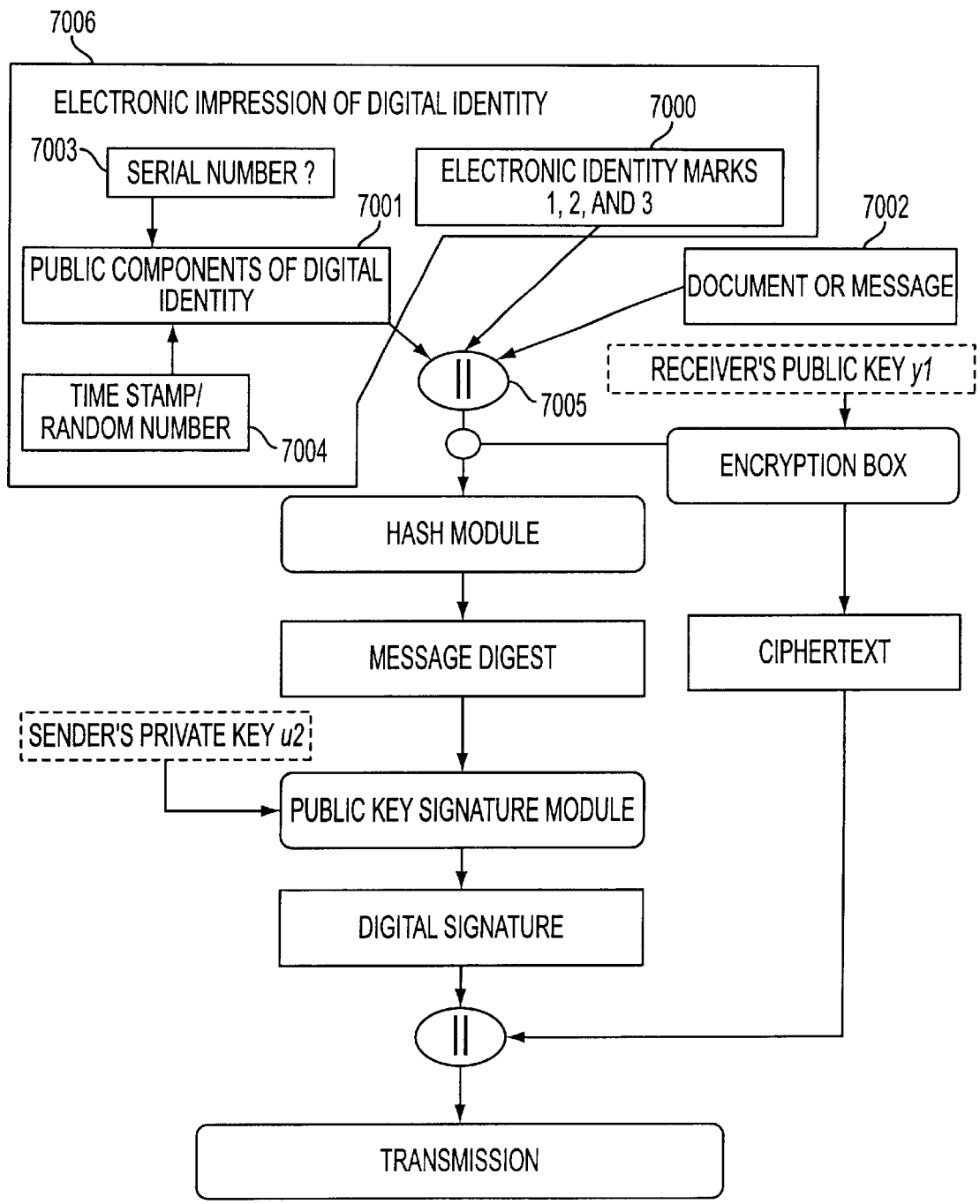
FIG. 8 and FIG. 9 are flow charts showing how an electronic impression, that includes the identity marks made by a digital identity, is carried with a document using the conventional cryptographic systems shown in FIGS. 1, 2 and 3.
Figure 9:
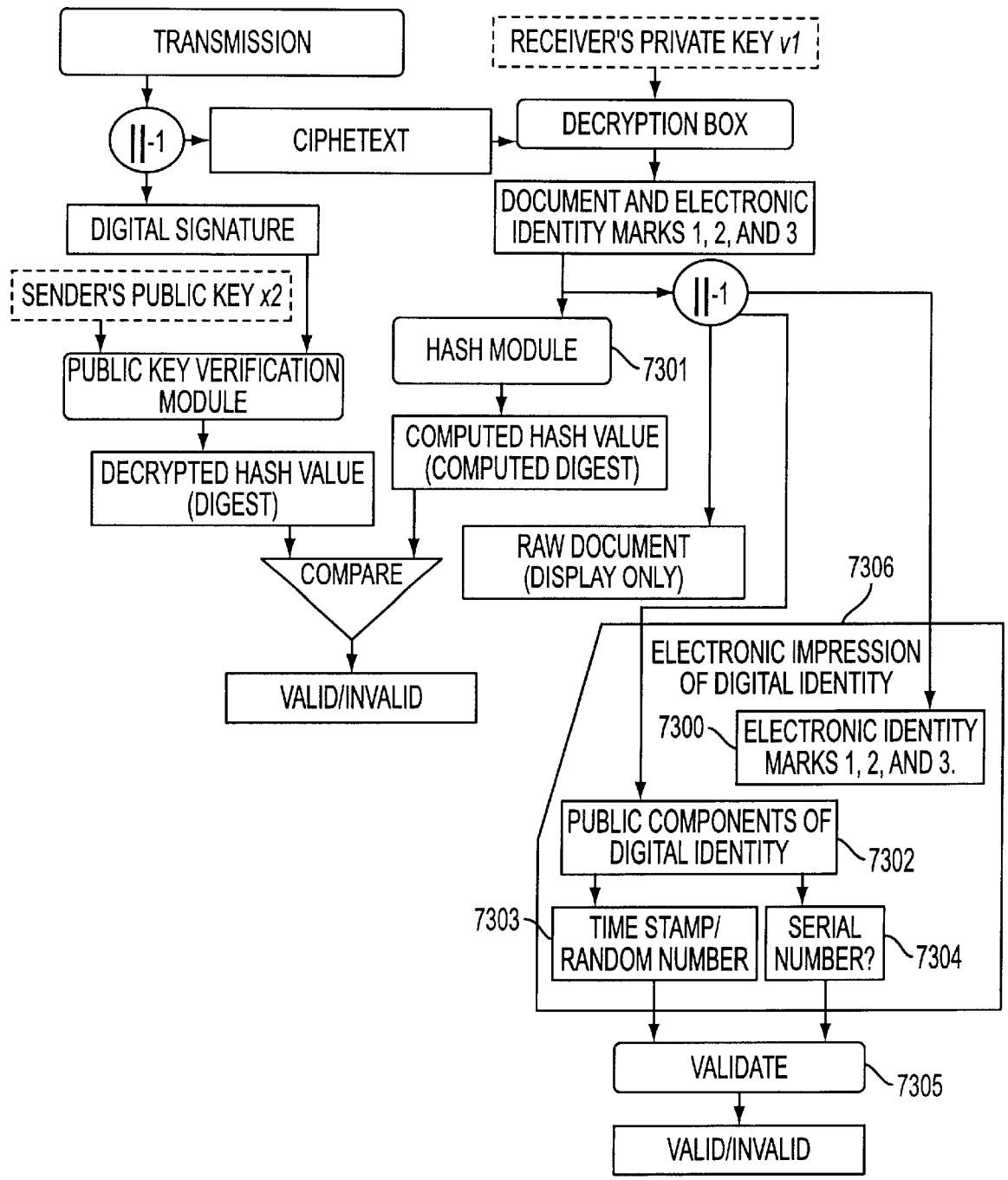

To carry the electronic impressions, made by a digital identity on a given document, with the document itself using the conventional cryptographic systems discussed above with respect to FIGS. 1, 2 and 3, some adjustments are made. These adjustments are shown in FIG. 8 and FIG. 9. FIG. 8 shows that the document (7002) is first concatenated with the public components of the digital identity (7001) and watermarks (7000) which now also carry a serial number (7003) and a random number or a universal time-stamp and positional information corresponding to a particular impression (7004). The concatenation is then presented to the conventional cryptographic protocol discussed earlier.

A serial number is used to detect if any documents in previous transmissions to the same receiver were destroyed during transmission. A random number or time stamp provides protection against reuse or "electronic duplicate as original" attacks. If the document has a unique time-stamp or random number, the receiver can check his or her database to determine whether the same document has been presented to him or her before. The positional information is expressed in a coordinate system relative to the document, or a relative address in the document (e.g. relative byte address), or as an index to a node if the document is being represented by a tree consisting of one or more nodes. The verification that is based on the positional information (associated with a particular impression on a given document) detects against possible attacks to reuse the impression at a different place in the document.

A protocol for inserting and deleting electronic impressions from a document (also called Impression Insertion/Deletion Protocol) governs the policies for allowing or disallowing an authenticated user from inserting a new impression into or deleting an existing impression from a given document. This embodiment covers insertion of new impressions provided the new impression occurs as part of a valid sequence or a hierarchy or a combination of the two schemes. Similarly, this embodiment also covers deletion of existing impressions, belonging to an authenticated user by the same user provided the deletion of an existing impression follows a valid sequence or a hierarchy or a combination of the two schemes. This embodiment, depending upon the impression insertion/validation protocol, does allow an override of an existing signature by a higher authority while maintaining a history of the insertions and deletion of impressions made to the document.

FIG. 9 depicts the modifications made in the verification process. The modifications required include separation box 7301 that separates the document from identity marks (7003) and public components of the digital identity (7302). The serial numbers, positional information and time-stamp/random information are validated by comparing them with information stored in a database. When the conventional digital signature attached to the document is validated and the time-stamp or random number attached to a document is validated, the binding of the electronic impression made by a digital identity with the document is deemed authentic and the decrypted document is then displayed along with some of the information in the public components of a digital identity. In this embodiment, the handwritten signature or seal or photographic image or biometric part of the digital identity is displayed with the document to indicate that the document was indeed signed with the digital identity. The separated identity marks can be used for additional verification as described in the explanation of FIG. 7.

Note that such verifications based on the identity marks are necessary only in case of a dispute over the validity of the binding of the electronic impressions made by a digital identity of the signer with the document. For day-to-day verification of this binding, the verification of the conventional digital signature (based on public key cryptography) shown in FIG. 9 will suffice. The conventional verification process needs only the public key of the signer which can be published and maintained easily. The correctness of the conventional digital signature process depends solely on the public key cryptographic assumption and integrity of the private key.

In some embodiments, after a person has used his digital identity to make an electronic impression on a particular document, the same person can delete that impression after re-authenticating himself, even though the same person and/or other parties have later signed the same document. Depending upon the impression insertion/deletion protocol being employed, the act of deleting a particular impression from a document will either:

1. nullify/invalidate/delete the later impressions in case of a sequential protocol; or
2. nullify/invalidate/delete the subordinate impressions in case of a hierarchical protocol; or
3. nullify/invalidate/delete all the subordinate impressions along with all impressions containing time-stamps that were later than the time-stamp of the impression being deleted; or
4. have no effect on other impressions in any way.

Recovery of Digital Identity

In case the device on which the user's digital identity resides is lost, the unique personal identifiers 1 and 2 can be fully recovered as long as the signer maintains his long term memory. This can be done by taking the custom questions out of the public components of the digital identity available from any previously signed document, and repeating the entire digital identity creation process, which implies that the user must remember the answers to all the questions he used in the original identity. The reconstructed identity will contain personal identifiers 1 and 2 that will be exact matches of that contained in the original digital identity. These identifiers can be used for verification of identity marks for detection of forgeries (when the public key cryptographic assumption is broken or when the private key is stolen).

Alternate Embodiments

The use of a digital identity is not limited to the authentication of documents. It can be used in any application where the identity of an individual has to be verified. In current real life situations, wherever an individual is required to show a picture ID, give personal information, or produce other forms of identification to prove her identity, a digital ID carried in a smart card or a memory card or a floppy disk can be used for more reliable validation. The password and/or pin number will restrict the access to the smart card, and the smart card will not allow access to usage of a private key for signature unless the user successfully answers all questions proposed to him. The private key, private information and answers to questions will never be accessible externally from the smart card. In an alternate embodiment, the smart card, in addition to carrying the digital identity in its memory, can also have affixed to it a picture of the owner (for visual comparison with the owner when the owner is using the smart card to perform various transactions) and contain additional information on a magnetic strip similar to the cards used for everyday digital IDs.

In an example scenario, an individual carries his memory device, e.g., a smart card or a memory card or a floppy disk, containing the individual's digital identity. At the point of verification, the device is inserted into the verification machine that asks the individual to authenticate himself by carrying out a brief question and answer session similar to the one depicted in FIG. 5. Successful answers to all the random questions posed will provide an additional strong security feature that is missing from the currently available system. This question and answer session eliminates the need for the human operators to listen to the private information of the individual, which in itself is a security risk. Other forms of identity verification such as picture ID, and other biometric information may still be used since they provide orthogonal means of identity verification.

Conventionally, passwords are used for logging on to computers. A digital identity can be used as a substitute for a password when logging onto a computer system. It is well known that easy to remember passwords can easily be broken. Therefore, critical system administration passwords are chosen to be very difficult to break, and are typically difficult to remember. This invention provides an alternative procedure for creating a secure password that is generated automatically from the personal information of the individual seeking authentication. This is achieved by using the recoverable personal identifiers of the individual as shown in FIG. 4 in place of the password. These identifiers will be relatively long, and would be extremely difficult to guess. However, the person to whom they belong will not have to remember a cryptic password. The number of questions posed to the individual during his authentication session can be made to depend on the level of security required for that particular session.

Multiple impressions belonging to one or more signers may be made in the same document at multiple locations. Each instance of an impression made by a digital identity is considered a unique impression. These impressions are maintained in a sequential order or a hierarchical order or a combination thereof.

While this invention has been described and illustrated with reference to particular embodiments, it will be readily apparent to those skilled in the art that the scope of the present invention is not limited to the disclosed embodiments but, on the contrary, is intended to cover numerous other modifications and equivalent arrangements which are included within the spirit and scope of the following claims.

What is claimed is:

1. A method of creating a digital identity for a person suitable for use when digitally signing documents, the method comprising the steps of:

generating a private digital representation of private information known only to the person, the private information including individual-specific questions and individual-specific answers provided by the person;

generating a public digital representation of public information about the person;

generating at least one public/private key pair for the person, and associating the private key with the person;

generating at least one symmetric key, suitable for symmetric encryption/decryption, deduced from information including personal information;

generating one or more sets of recoverable and non-recoverable personal identifiers based on public and private information including the individual-specific questions and individual-specific answers;

encrypting the public and private digital representations, the private key of the public/private key pair and the personal identifiers using the symmetric key to generate the digital identity; and computation of multiple identity marks that are based upon data that is contained in and/or is derived from the digital identity, in particular the personal identifiers, as well as other information including a document and data that is unique to each instance of a signature on a digital document, wherein each instance of the signature is unique and verifiable by the owner of the digital identity, recipient(s) of the document and/or third parties verifying the signature and/or the digital document.

2. The method of claim 1, wherein the symmetric key is generated from a subset of information including user's name and static private information.

3. The method of claim 1, wherein additional information includes data selected from the set consisting of a person's picture, handwritten signatures, stamp and seal, and the person's biometric data including fingerprints, speech, and retina scans.

4. The method of claim 1, including the steps of:

computing recoverable personal identifier 1 by applying a hash function to the result of a concatenation operation performed on data including the person's public name and static private information;

computing recoverable personal identifier 2 by applying a hash function to the result of a concatenation operation performed on data including personal identifier 1, individual-specific public questions and individual-specific private answers;

computing unrecoverable personal identifier 3 by applying the hash function to the result of a concatenation operation performed on data including personal identifier 2, handwritten signature and/or images and other biometric information;

wherein at least one recoverable personal identifier, personal identifier 1, can be regenerated by the person signing the document and/or by any authority which has access to the static private information of the user by reapplying the hash function to the static information including the static private information;

wherein at least one recoverable personal identifier, personal identifier 2, can be regenerated by reapplying the hash function to exactly the same public and private information while recovering the digital identity;

wherein at least one unrecoverable personal identifier, personal identifier 3, is generated using techniques that do not reliably produce exactly identical results with each repetition.

5. The method of claim 1, including storing the digital identity on a portable storage device readable by a computer.

6. The method of claim 5, including affixing a photograph of the owner of the digital identity on an exterior surface of the storage device to serve as a Picture ID.

7. The method of claim 5, wherein owner associated identification information is stored in a magnetic strip affixed to the portable storage device.

8. The method of claim 5, further comprising the steps of:
storing with the digital identity an indication of a desired level of security; and applying the indicated level of security, when using the digital identity to digitally sign a document, including the steps of:
authenticating a user's ownership of the digital identity by accepting data including user name, pin number and password for regenerating the key suitable for symmetric encryption/decryption;
rejecting the user when user's ownership is not authenticated as the regenerated symmetric key fails to decrypt the digital identity;
further authenticating a user's ownership of the digital identity by requesting additional information including individual-specific private answers to individual-specific public questions, wherein the type of information being requested is randomly selected from a set of data contained in the digital identity, with members of the data set being chosen based upon the desired level of security stored as part of the digital identity; and
rejecting the user when user's ownership is not authenticated.

9. The method of claim 5, including having a trusted third party certify public information components of the digital identity and durably storing a record of the certification.

10. The method of claim 9, wherein the public information components of the digital identity are stored in a repository for reconstruction and recovery.

11. The method of claim 9, wherein the public information components of the digital identity are kept in escrow with one or more trusted third parties.

12. The method of claim 5, further comprising the steps of: editing the digital identity, and storing with the digital identity history data representing changes made to the digital identity.

13. The method of claim 4, wherein copies of at least two different ones of the personal identifiers are kept in escrow with at least two respective trusted third parties.

14. The method of claim 8, for binding an electronic impression of the digital identity to a digital document, by:
authenticating a user's ownership of the digital identity;
rejecting the user when user's ownership is not authenticated;
creating identity marks corresponding to the personal identifiers, each identity mark being created by performing a hash function on a combination of information including one of the personal identifiers, information uniquely associated with the document and its contents; and
applying a cryptographic function to at least one set of information to create a digital signature, wherein the instructions for assembling each set of information further comprises instructions for:
selecting information related to one of the identity marks;
selecting information uniquely associated with the document including its contents;
selecting information uniquely associated with the electronic impression being made by the digital identity; and
binding at least one of the digital signatures, corresponding to one of the identity marks, to a representation of the document.

15. The method of claim 14, wherein the information to which the cryptographic function is applied includes positional information providing a basis for detecting:
use of the digital signature at a position different from the original position within the document; and/or use of the digital signature on a document that is different than or modified from the document to which the digital signature was bound;
wherein the step of computing positional information further comprises the steps of:
computing positional information in a coordinate system relative to the document; and/or
computing positional information as a relative address within the document; and/or
computing positional information as an index to a node if the document is being represented by a tree consisting of one or more nodes.

16. The method of claim 14, wherein the information to which the cryptographic function is applied includes a serial number, the serial number providing a basis for detecting duplicate usage of the digital signature.

17. The method of claim 14, wherein the information to which the cryptographic function is applied includes a timestamp and/or a random number, the timestamp and/or a random number providing a basis for detecting duplicate usage of the digital signature.

18. The method of claim 14, including the steps of:
verifying the digital impression of the digital identity on the document by separating the document from at least one of the digital signatures and corresponding information including the positional information, serial number, random number and/or timestamp and public components of the digital identity that are bound with the document as part of the digital impression;
decrypting the digital signature; and
verifying the digital signature.

19. The method of claim 18, wherein the step of verifying the digital signature includes obtaining one or more personal identifiers associated with the person alleged to have digitally signed the document directly from the digital identity of the alleged signer or from one or more trusted third parties with whom the personal identifiers have been stored.

20. The method of claim 18, wherein the step of verifying the digital signature includes recomputing a set of identity marks and comparing the recomputed identity marks with the identity mark obtained from the digital signature that is part of the electronic impression bound to the document.

21. The method of claim 18, wherein the step of verifying the digital signature includes a step selected from the set consisting of:
comparing the digital signature with another digital signature by the same alleged signer;
comparing current biometric data associated with the alleged signer with biometric data included in the digital impression bound to the document; and
requiring the alleged signer to provide at least some of the answers to the questions included in the personal information that is included in the digital identity that was used to sign the document.

22. The method of claim 8, wherein the step of applying the indicated level of security further comprises the steps of:

authenticating a user's ownership of the digital identity by accepting a subset of data including user's name and static private information for computing a key suitable for symmetric encryption/decryption; and rejecting the user when user's ownership is not authenticated and the symmetric key fails to decrypt the digital identity.

23. The method of claim 8, wherein the desired level of security is changed by the owner of the digital identity.

24. The method of claim 8, wherein the digital identity is stored on a storage media attached to a computer system, accessible to the owner of the identity, and the digital identity is used for authentication including logging on to computers.

25. The method of claim 24, wherein the digital identity is used for signing digital documents.

26. The method of claim 24, wherein the step of authentication further comprises the steps of creating and using a password from the personal information including the personal identifiers of the person seeking authentication.

27. The method of claim 24, wherein the desired level of security is changed by the owner of the digital identity.

28. The method of claim 8, wherein the step of applying desired level of security further comprises the steps of:

detecting that a user is unable to prove, through finite number of trials, ownership of the digital identity;

locking the system for a deterministic wait period; and erasing the digital identity information from the volatile memory.

29. The method of claim 24, wherein the step of authentication further comprises the steps of:

detecting that a user is unable to prove, through finite number of trials, ownership of the digital identity;

locking the system for a deterministic wait period; and erasing the digital identity information from the volatile memory.

30. The method of claim 25, wherein the step of signing further comprises the steps of:

detecting that a user is unable to prove, through finite number of trials, ownership of the digital identity;

locking the system for a deterministic wait period; and erasing the digital identity information from the volatile memory.

31. The method of claim 28, wherein the step of locking the system further comprises the step of changing the level of security to a higher level to make the digital identity more securer against potential attacks.

32. The method of claim 29, wherein the step of locking the system further comprises the step of changing the level of security to a higher level to make the digital identity more securer against potential attacks.

33. The method of claim 30, wherein the step of locking the system further comprises the step of changing the level of security to a higher level to make the digital identity more secure against potential attacks.

34. The method of claim 12, wherein at least one of the personal identifiers is stored with a third party for notarization and durably storing a record of the notarization.

35. The method of claim 34, wherein the step of storing at least one of the personal identifiers with a third party, further comprises the steps of:

owner of the digital identity creating at least one additional public/private key pair;

encrypting the personal identifiers using the public key of a public/private key pair; and storing the encrypted version of one of the personal identifiers with the third party.

36. The method of claim 14, wherein at least one of the identity marks is stored with a third party for notarization and durably storing a record of the notarization.

37. The method of claim 36, wherein the step of storing at least one of the identity marks with a third party, further comprises the steps of:

owner of the digital identity creating at least one additional public/private key pair;

encrypting the identity mark using the public key of a public/private key pair; and storing the encrypted version of one of the identity marks with the third party.

38. The method of claim 12, further comprising the steps of: editing the digital identity, and storing with the digital identity additional data including owner profile information for use with electronic systems over the Internet.

39. The method of claim 35, wherein copies of at least two different ones of the encrypted personal identifiers are kept in escrow with at least two respective trusted third parties.

40. The method of claim 37, wherein copies of at least two different ones of the encrypted identity marks are kept in escrow with at least two respective trusted third parties.

41. The method of claim 14, wherein at least one of the identity marks is created by performing a hash function to the concatenation of at least one of the personal identifiers with the information uniquely associated with the document including its contents.

42. The method of claim 14, wherein at least one set of information, used for computing one of the digital signatures, includes a hash of the document instead of the document.

43. The method of claim 14, wherein the information to which the cryptographic function is applied includes a random number, the random number providing a basis for detecting duplicate usage of the digital signature.

44. The method of claim 14, wherein one or more signers with each signer, using a digital identity owned by each signer, making one or more electronic impressions to the same document at different positions in the document.

45. The method of claim 44, wherein one or more electronic impressions at multiple locations in the document, made by the same signer or multiple signers, are assembled and bound to the same document comprising the steps of:

assembling and binding one or more electronic impressions in a sequential order; and/or assembling and binding one or more electronic impressions in a hierarchical order; and/or assembling and binding one or more electronic impressions using a combinations of sequential and hierarchical order.

46. The method of claim 14, further comprising the step of displaying the document and at least a subset of the information associated with the digital impression including biometric data on signer's terminal.

47. The method of claim 18, further comprising the step of displaying the document and at least a subset of the information associated with the digital impression including biometric data on the terminal of a recipient and/or a verifier with access to signer's public keys.

48. The method of claim 14, wherein the step of binding an electronic impression of the digital identity by a signer further comprising the steps of:

inserting at least one more electronic impressions, in the same document, by the signer after reauthenticating himself with the digital identity; and/or deleting at least one or more electronic impressions belonging to the signer, from the same document, by the signer after reauthenticating himself with the digital identity.

49. The method of claim 48, wherein the step of inserting an electronic impression by a signer after the signer has reauthenticated himself, further comprising instructions for:

checking that the signer is inserting the new impression in the document while maintaining a valid sequence or a valid hierarchy or a combination thereof.

50. The method of claim 48, wherein the step of deleting an existing electronic impression made by a signer, belonging to the signer, after the signer has reauthenticated himself, further comprising instructions for:

checking that the signer is deleting the existing impression from the document while maintaining a valid sequence or a valid hierarchy or a combination thereof.

51. The method of claim 50, wherein the step of deleting an existing impression, further comprises a step of:

nullifying and/or invalidating and/or deleting impressions that were made later than the impression being deleted in case of a sequential signature protocol;

nullifying and/or invalidating and/or deleting impressions that are subordinate to the impression being deleted in case of a hierarchical signature protocol;

nullifying and/or invalidating and/or deleting impressions that are subordinate to the impression being deleted along with the impressions that were made later than the impression being deleted or are subordinate to a later impression in case a signature protocol includes both sequential and hierarchical features;

nullifying and/or invalidating and/or deleting the impression in case the signature protocol allows it.

52. A computer program product for use in conjunction with a processor, the computer program product comprising a first computer readable storage medium and a computer program mechanism embedded therein, the computer program mechanism comprising a controller configuration system procedure for creating a digital identity for a person suitable for use when digitally signing documents, the controller configuration system procedure including instructions for:

generating a private digital representation of private information known only to the person, the private information including individual-specific questions and individual-specific answers provided by the person;

generating a public digital representation of public information about the person;

generating at least one public/private key pair for the person, and associating the private key with the person;

generating at least one symmetric key, suitable for symmetric encryption/decryption, deduced from information including personal information;

generating one or more sets of recoverable and non-recoverable personal identifiers based on public and private information including the individual-specific questions and individual-specific answers;

encrypting the public and private digital representations, the private key of the public/private key pair and the personal identifiers using the symmetric key to generate the digital identity; and computation of multiple identity marks that are based upon data that is contained in and/or is derived from the digital identity, in particular the personal identifiers, as well as other information including a document and data that is unique to each instance of a signature on a digital document, wherein each instance of the signature is unique and verifiable by the owner of the digital identity, recipient(s) of the document and/or third parties verifying the signature and/or the digital document.

53. The computer program product of claim 52, further comprising instructions for:

storing with the digital identity an indication of a desired level of security; and applying the indicated level of security, when using the digital identity to digitally sign a document, including the steps of:

i. authenticating a user's ownership of the digital identity by accepting data including user name, pin number and password for regenerating the key suitable for symmetric encryption/decryption;

ii. rejecting the user when user's ownership is not authenticated as the regenerated symmetric key fails to decrypt the digital identity;

iii. further authenticating a user's ownership of the digital identity by requesting additional information including individual-specific private answers to individual-specific public questions, wherein the type of information being requested is randomly selected from a set of data contained in the digital identity, with members of the data set being chosen based upon the desired level of security stored as part of the digital identity;

rejecting the user when user's ownership is not authenticated.

54. The computer program product of claim 53, including instructions for: binding an electronic impression of the digital identity to a digital document, by:

authenticating a user's ownership of the digital identity;

rejecting the user when user's ownership is not authenticated;

creating identity marks corresponding to the personal identifiers, each identity mark being created by performing a hash function on a combination of information including one of the personal identifiers, information uniquely associated with the document and its contents; and applying a cryptographic function to at least one set of information to create a digital signature, wherein the instructions for assembling each set of information further comprises instructions for:

selecting information related to one of the identity marks;

selecting information uniquely associated with the document including its contents;

selecting information uniquely associated with the electronic impression being made by the digital identity; and binding at least one of the digital signatures, corresponding to one of the identity marks, to a representation of the document.

55. The computer program product of claim 54, including instructions for:

verifying the digital impression of the digital identity on the document by separating the document from at least one of the digital signatures and corresponding information including the positional information, serial number, random number and/or timestamp and public components of the digital identity that are bound with the document as part of the digital impression;

decrypting the digital signature; and verifying the digital signature.

56. The computer program product of claim 52, wherein the symmetric key is generated from a subset of information including user's name and static private information.

57. The computer program product of claim 54, wherein the digital identity is stored on a storage media attached to a computer system, accessible to the owner of the identity, and the digital identity is used for authentication including logging on to computers.

58. The computer program product of claim 52, wherein at least one of the personal identifiers is stored with a third party for notarization and durably storing a record of the notarization.

59. The computer program product of claim 52, further comprising instructions for editing the digital identity, and storing with the digital identity additional data including owner profile information for use with electronic systems over the Internet.

60. The computer program product of claim 54, wherein one or more signers with each signer, using a digital identity owned by each signer, making one or more electronic impressions to the same document at different positions in the document.

61. The computer program product of claim 60, wherein one or more electronic impressions at multiple locations in the document, made by the same signer or multiple signers, are assembled and bound to the same document comprising instructions for:
   assembling and binding one or more electronic impressions in a sequential order; and/or
   assembling and binding one or more electronic impressions in a hierarchical order; and/or
   assembling and binding one or more electronic impressions using a combinations of sequential and hierarchical order.

62. The computer program product of claim 54, further comprising instructions for displaying the document and at least a subset of the information associated with the digital impression including biometric data on signer's terminal.

63. The computer program product of claim 55, further comprising instructions for displaying the document and at least a subset of the information associated with the digital impression including biometric data on the terminal of a recipient and/or a verifier with access to signer's public keys.

64. The computer program product of claim 54, wherein the step of binding an electronic impression of the digital identity by a signer further comprising instructions for:
   inserting at least one more electronic impressions, in the same document, by the signer after reauthenticating himself with the digital identity; and/or
   deleting at least one or more electronic impressions belonging to the signer, from the same document, by the signer after reauthenticating himself with the digital identity.

65. The computer program product of claim 64, wherein the step of inserting an electronic impression by a signer after the signer has reauthenticated himself, further comprising instructions for:
   checking that the signer is inserting the new impression in the document while maintaining a valid sequence or a valid hierarchy or a combination thereof.

66. The computer program product of claim 64, wherein the step of deleting an existing electronic impression made by a signer, belonging to the signer, after the signer has reauthenticated himself, further comprising instructions for:
   checking that the signer is deleting the existing impression from the document while maintaining a valid sequence or a valid hierarchy or a combination thereof.

67. The computer program product of claim 57, wherein the digital identity is used for signing digital documents.

* * * * *